United States Patent
Takita et al.

(10) Patent No.: US 10,090,923 B2
(45) Date of Patent: Oct. 2, 2018

(54) INFORMATION PROCESSING APPARATUS, WAVELENGTH DEFRAGMENTATION METHOD, AND NON-TRANSITORY RECORDING MEDIUM RECORDING WAVELENGTH DEFRAGMENTATION PROGRAM

(71) Applicant: FUJITSU LIMITED, Kawasaki-shi, Kanagawa (JP)

(72) Inventors: Yutaka Takita, Kawasaki (JP); Shigeru Ishii, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 15/384,761

(22) Filed: Dec. 20, 2016

(65) Prior Publication Data
US 2017/0230113 A1     Aug. 10, 2017

(30) Foreign Application Priority Data

Feb. 10, 2016   (JP) ................. 2016-023797

(51) Int. Cl.
| | |
|---|---|
| H04B 10/08 | (2006.01) |
| H04B 17/00 | (2015.01) |
| H04J 14/00 | (2006.01) |
| H04J 14/02 | (2006.01) |
| H04B 10/079 | (2013.01) |

(52) U.S. Cl.
CPC .... *H04B 10/07957* (2013.01); *H04J 14/0257* (2013.01)

(58) Field of Classification Search
USPC ........................................ 398/34, 67, 79, 49
See application file for complete search history.

(56) References Cited

U.S. PATENT DOCUMENTS

| | | | |
|---|---|---|---|
| 2012/0237212 A1* | 9/2012 | Nishihara ........... | H04J 14/0204 398/26 |
| 2013/0195460 A1* | 8/2013 | Kadohata ............ | H04J 14/0257 398/79 |

(Continued)

FOREIGN PATENT DOCUMENTS

| | | |
|---|---|---|
| JP | 2014-192642 | 10/2014 |
| JP | 2014-229938 | 12/2014 |
| JP | 2015-106861 | 6/2015 |

OTHER PUBLICATIONS

Akihiro Kadohata, "Wavelength Defragmentation Algorithm for Transparent Multi-ring Networks with Multiple Fibers per Link", 2013, OFC/NFOEC Technical Digest, All pages.*

*Primary Examiner* — David Payne
*Assistant Examiner* — Pranesh Barua
(74) *Attorney, Agent, or Firm* — Fujitsu Patent Center

(57) ABSTRACT

An information processing apparatus, includes: a memory that stores a wavelength defragmentation program; and a processor that performs, based on the wavelength defragmentation program, operations of: selecting an optical line according to a specific sequence in design information to allocate optical lines for respective optical wavelengths within a network; moving a selected optical line to a move-to optical wavelength; stopping, when movement of the selected optical line to the move-to optical wavelength is difficult, a selection of the optical line according to the specific sequence; and selecting a new optical line from optical lines indicated in a priority list.

12 Claims, 15 Drawing Sheets

(56) References Cited

U.S. PATENT DOCUMENTS

| | | | |
|---|---|---|---|
| 2013/0336655 A1* | 12/2013 | Grobe | H04J 14/0246 398/67 |
| 2014/0098828 A1* | 4/2014 | Nakagawa | H01S 5/0612 372/20 |
| 2014/0205281 A1* | 7/2014 | Sone | H04J 14/0212 398/25 |
| 2014/0294384 A1* | 10/2014 | Wakabayashi | H04J 14/0257 398/49 |
| 2014/0344433 A1* | 11/2014 | Takita | H04L 41/145 709/223 |
| 2015/0063800 A1* | 3/2015 | Htay | H04L 41/5029 398/48 |
| 2016/0352452 A1* | 12/2016 | Takeshita | H04J 14/0267 |

* cited by examiner

US 10,090,923 B2

INFORMATION PROCESSING APPARATUS, WAVELENGTH DEFRAGMENTATION METHOD, AND NON-TRANSITORY RECORDING MEDIUM RECORDING WAVELENGTH DEFRAGMENTATION PROGRAM

CROSS-REFERENCE TO RELATED APPLICATION

This application is based upon and claims the benefit of priority of the prior Japanese Patent Application No. 2016-023797, filed on Feb. 10, 2016, the entire contents of which are incorporated herein by reference.

FIELD

The embodiment discussed herein are related to an information processing apparatus, a wavelength defragmentation method, and a non-transitory recording medium that records a wavelength defragmentation program.

BACKGROUND

In networks, software defined networking (SDN) and network functions virtualization (NFV) are introduced.

A related technology is disclosed in Japanese Laid-open Patent Publication No. 2014-229938 or Japanese Laid-open Patent Publication No. 2015-106861.

SUMMARY

According to an aspect of the embodiments, an information processing apparatus, includes: a memory that stores a wavelength defragmentation program; and a processor that performs, based on the wavelength defragmentation program, operations of: selecting an optical line according to a specific sequence in design information to allocate optical lines for respective optical wavelengths within a network; moving a selected optical line to a move-to optical wavelength; stopping, when movement of the selected optical line to the move-to optical wavelength is difficult, a selection of the optical line according to the specific sequence; and selecting a new optical line from optical lines indicated in a priority list.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, introduction of SDN enables flexible operations by which optical lines can be dynamically set and reset, but wavelength resources are fragmented, which may make wavelength blocking likely to occur at the time of setting a new optical line.

Figure 10:
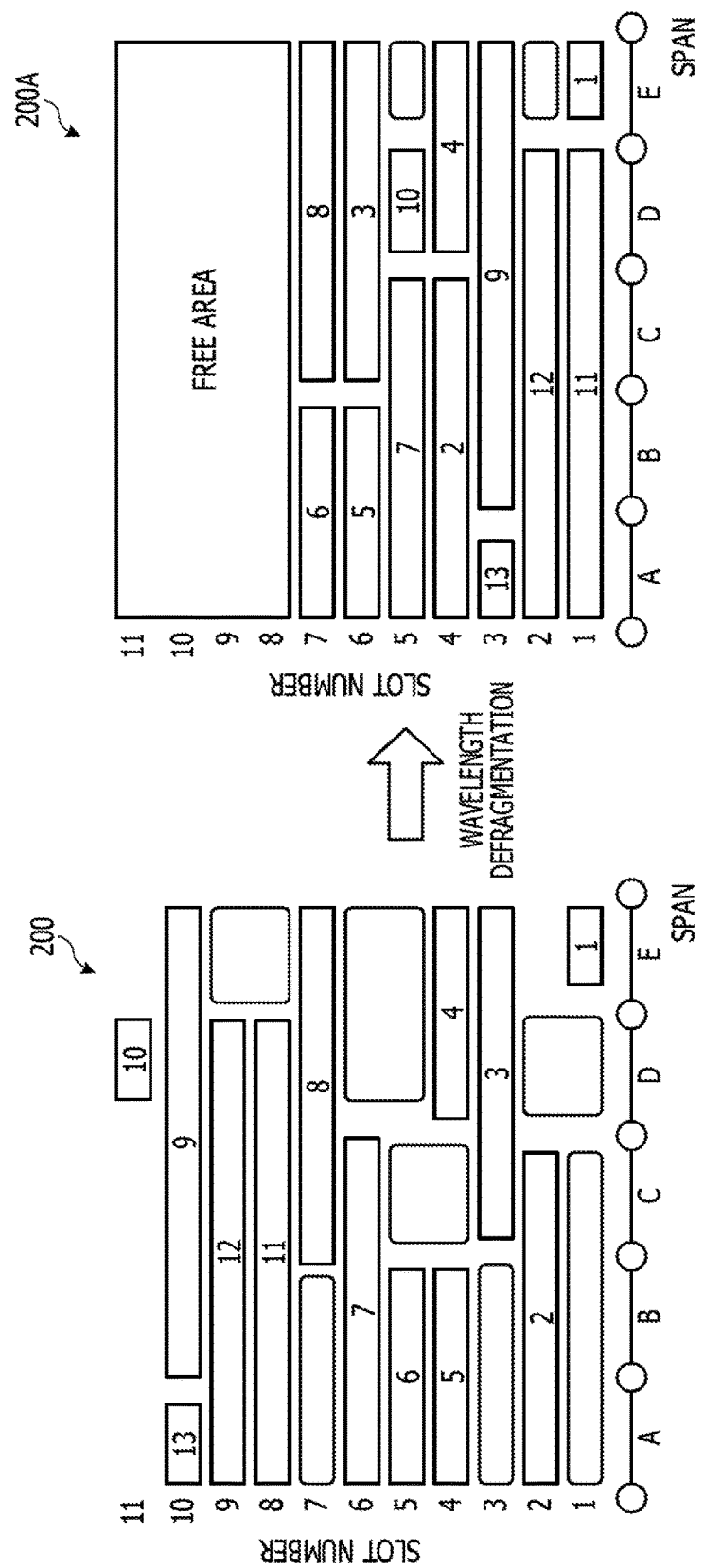
FIG. 10 illustrates examples of optical line allocation tables before and after defragmentation.

For example, wavelength defragmentation in which a mathematical programming method is used is employed as a method of reducing fragmentation of wavelength resources. In wavelength defragmentation, the maximum number of wavelengths used within a network is evaluated as an index in fragmentation, and optical wavelength fragmentation caused by the dynamic setting and resetting of optical lines for each optical wavelength in each span is reduced according to network design results. FIG. 10 illustrates examples of optical line allocation tables before and after defragmentation. In the optical line allocation table 200, the vertical axis indicates slot numbers of optical wavelengths and the horizontal axis indicates inter-node spans. In the optical line allocation table 200, for 13 optical lines, for example, slot numbers 1 to 11 corresponding to 11 types of wavelengths are prepared for each of spans A to E. In the optical line allocation table 200 before defragmentation, illustrated in FIG. 10, 13 optical lines are allocated to 11 wavelengths (slot numbers 1 to 11) for each span. In the optical line allocation table 200A after defragmentation, when wavelength defragmentation is performed for the optical line allocation table 200, the 13 optical lines 1 to 13 are allocated to seven optical wavelengths (slot numbers 1 to 7). As a result, resources for four optical wavelengths (slot numbers 8 to 11) are saved when the optical line allocation table 200A after defragmentation is compared with the optical line allocation table 200 before defragmentation, so a free band from slot number 8 to slot number 11 is secured.

For example, due to the widespread use of SDN and NFV, disaggregation of coexistent network devices from different vendors advances to reduce the capital expenditure (Capex) of the whole of a network, and due to the diversification of modulation methods used for optical lines, the aggressive use of FlexGrid for wavelength resources also advances. As a result, in a situation in which FlexGrid is aggressively used, a type of operation to minimize a transmission penalty margin for optical lines may be demanded.

For example, when defragmentation processing to move an optical line eligible for movement to its move-to optical wavelength in a span is executed, the optical line eligible for movement is moved and set to the move-to optical wavelength. For example, the optical line that have been moved and set may cause a crosstalk between the optical line and an optical line with an adjacent optical wavelength and the transmission properties of the optical line that have been moved and set and the optical line with an adjacent optical wavelength may be deteriorated. Therefore, the movement and setting of the optical line may be cancelled and wavelength defragmentation design may be performed again, which may take a time in wavelength defragmentation. For example, it may be difficult to apply a result of wavelength defragmentation based on information prepared in advance to an actual network without alteration. As a result, the wavelength defragmentation may be suspended in the middle, and a desired effect, which was initially assumed, of reducing fragmentation by wavelength defragmentation may not be obtained.

For example, a network design apparatus and a wavelength defragmentation method may be provided that can shorten a time taken for wavelength defragmentation while keeping the wavelength defragmentation at high precision.

Figure 1:
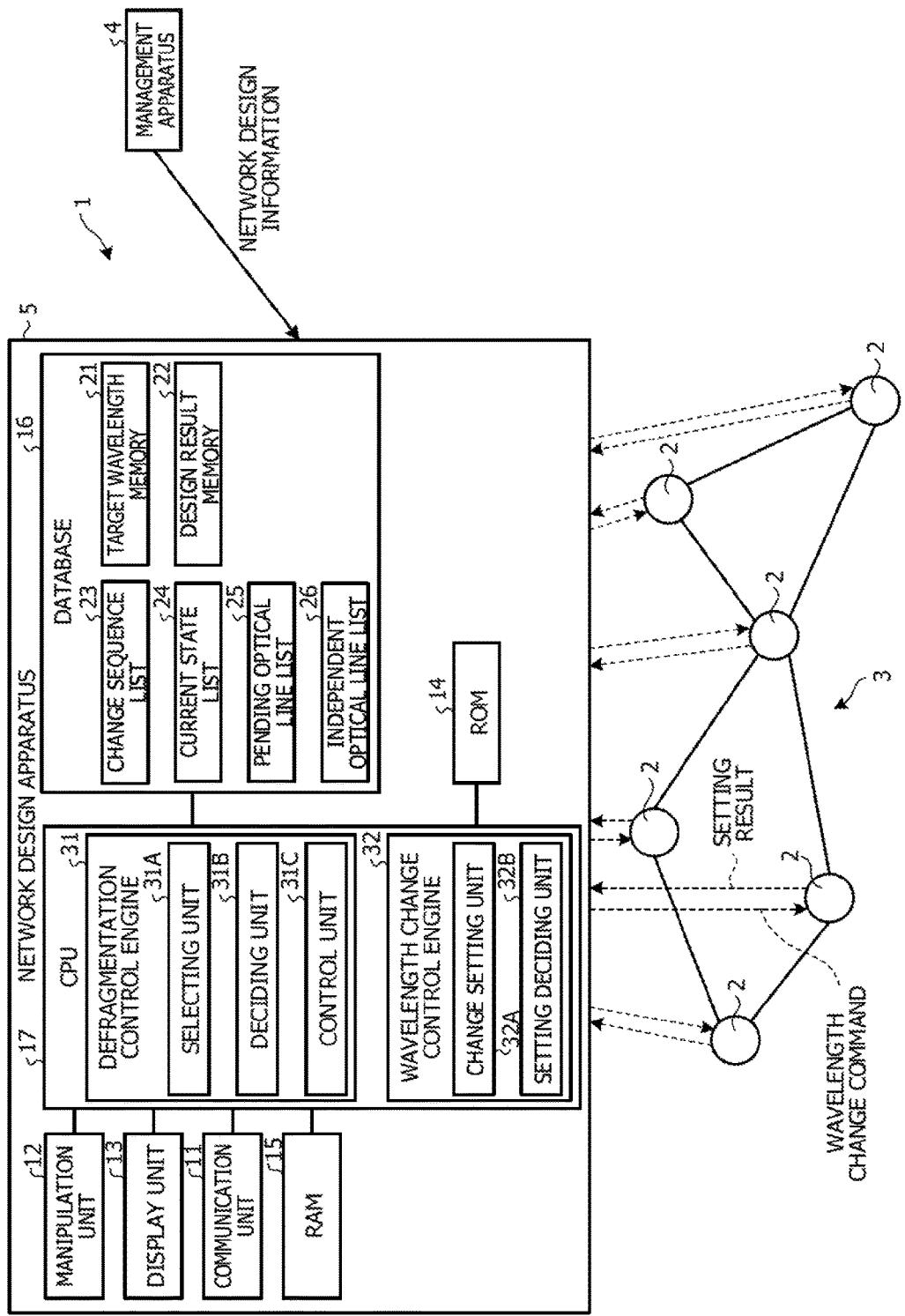
FIG. 1 illustrates an example of a network design system.

FIG. 1 illustrates an example of a network design system. The network design system 1 in FIG. 1 has an optical network 3 including a plurality of nodes 2, a management apparatus 4 that manages network design information within the optical network 3, and a network design apparatus 5. The optical network 3 may be a wavelength division multiplex (WDM) optical network. The network design information may include the number of optical lines within the optical network 3 designed by the management apparatus 4, the number of optical wavelengths, optical line allocation tables, in which spans between nodes 2 and the like are designed, and other design information. The management apparatus 4 and network design apparatus 5 may be structured by, for example, a workstation or a personal computer.

The network design apparatus 5 may be an apparatus that executes wavelength defragmentation as indicated in an optical line allocation table, in which optical lines are allocated to optical wavelengths for each span between nodes 2 on the optical network 3, according to the network design information from the management apparatus 4. The network design apparatus 5 has a communication unit 11, a manipulation unit 12, a display unit 13, a read-only memory (ROM) 14, a random-access memory (RAM) 15, a database 16, and a central processing unit (CPU) 17. The communication unit 11 may be an interface that interconnects the management apparatus 4 and each node 2 on the optical network 3 for communication between them. The manipulation unit 12 is an input interface including a keyboard, a mouse, and other devices manipulated by the user; the manipulation unit 12 accepts inputs of various types of data. The display unit 13 is an output interface that displays various types of information. The ROM 14 is a storage area in which various types of information, such as a defragmentation control engine, a wavelength change control engine, and other various programs, are stored. The RAM 15 is an area used to store various types of information. The RAM 15 is, for example, a work area in which a wavelength defragmentation program executed by the CPU 17 is loaded.

The database 16 has a target wavelength memory 21, a design result memory 22, a change sequence list 23, a current state list 24, a pending optical line list 25, and a independent optical line list 26. The target wavelength memory 21 is an area in which a target number of optical wavelengths, included in the maximum number of optical wavelengths available on the optical network 3, is stored.

Figure 2:
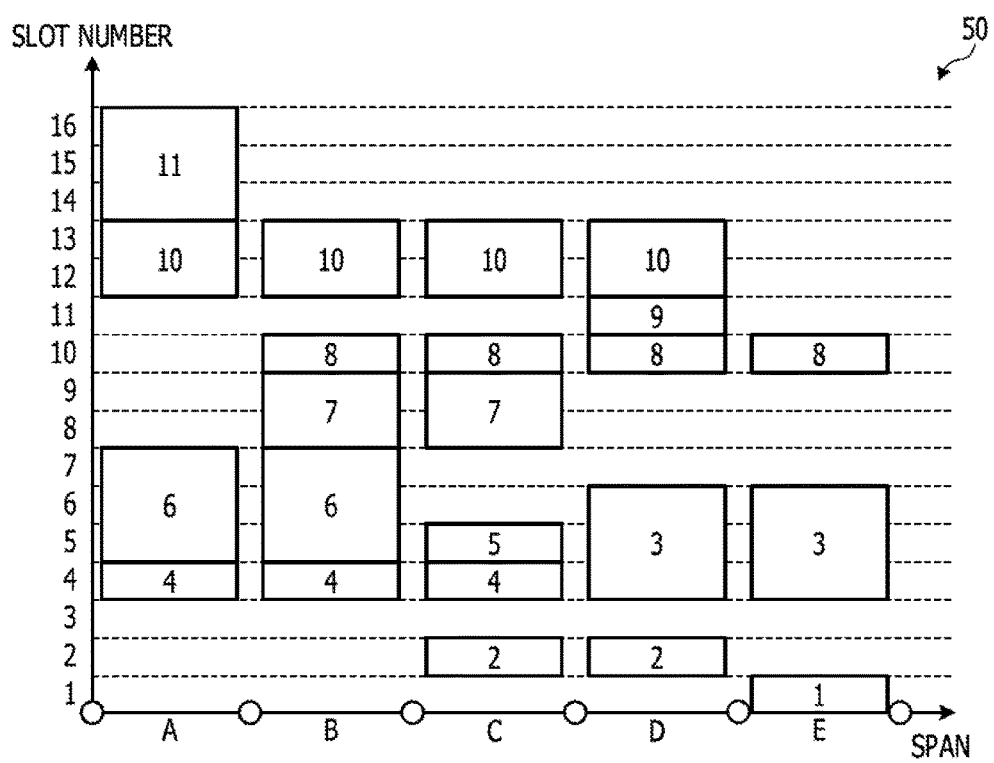
FIG. 2 illustrates an example of an optical line allocation table.

The design result memory 22 is an area in which an optical line allocation table, which is design information obtained from the management apparatus 4, is stored. FIG. 2 illustrates an example of an optical line allocation table. In the optical line allocation table 50 in FIG. 2, the vertical axis indicates slot numbers 1 to 16, each of which identifies the type of an optical wavelength, and the horizontal axis indicates spans A to E; optical lines are allocated for each slot number in each span. For example, a maximum of 16 optical wavelengths are prepared in the spans. For example, the optical line with line number 4 is allocated to slot number 4 in span A, and the optical line with line number 6 is allocated to slot numbers 5 to 7 in span A. The optical line with line number 10 is allocated to slot numbers 12 and 13 in span A, and the optical line with line number 11 is allocated to slot numbers 14 to 16 in span A. For example, the optical line with line number 4 is allocated to slot number 4 in span B, the optical line with line number 6 is allocated to slot numbers 5 to 7 in span B, and the optical line with line number 7 is allocated to slot numbers 8 and 9 in span B. The optical line with line number 8 is allocated to slot number 10 in span B, and the optical line with line number 10 is allocated to slot numbers 12 and 13 in span B.

Figure 3:
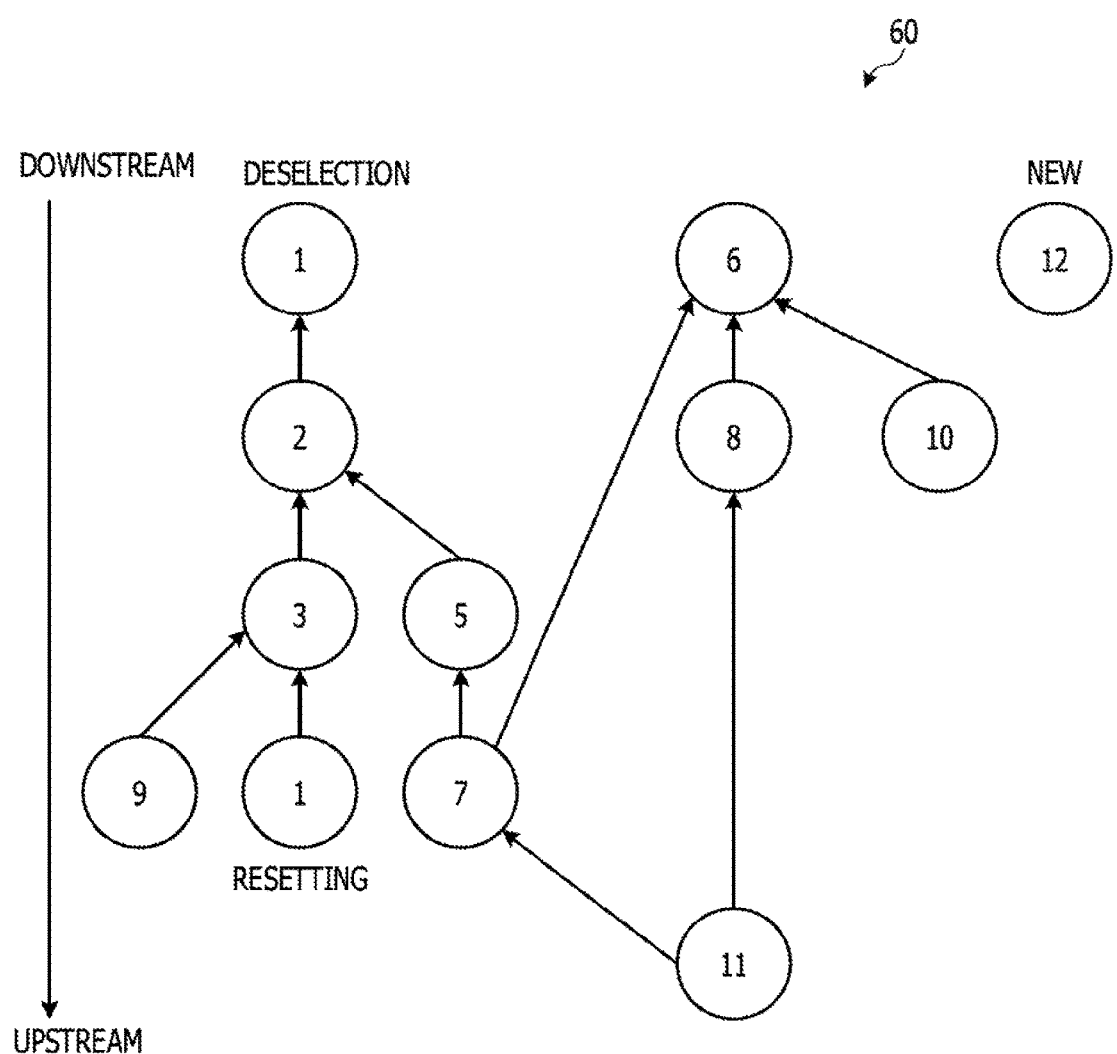
FIG. 3 illustrates an example of a change sequence graph.

The change sequence list 23 may be an area in which a change sequence graph, which indicates an optical line selection sequence in optical wavelength defragmentation is stored according to the optical line allocation table 50. FIG. 3 illustrates an example of a change sequence graph. The change sequence graph 60 has directed edges (arrows) to indicate the dependency relation of each optical line. An arrow (→) from 2 to 1 illustrated in FIG. 3 indicates the dependency relation that unless the optical line with line number 1 is moved from the optical wavelength in the slot number to which the optical line with line number 1 is allocated, it is difficult to move the optical line with line number 2 to the optical wavelength in the slot number. An arrow (→) from 3 to 2 indicates the dependency relation that unless the optical line with line number 2 is moved from the optical wavelength in the slot number to which the optical line with line number 2 is allocated, it is difficult to move the optical line with line number 3 to the optical wavelength in the slot number.

When executing optical wavelength defragmentation, the CPU 17 selects optical lines, preferentially starting from downstream optical lines, according to the change sequence graph 60 illustrated in FIG. 3. When the change sequence graph 60 in FIG. 3 is referenced, the optical lines with line numbers 1, 6, and 12 are optical lines indicated at the downstream end, the optical lines with line numbers 2, 8, and 10 are optical lines next to the downstream end, the optical lines with line numbers 3 and 5 are optical lines second next to the downstream end, the optical lines with line numbers 9 and 7 are optical lines third next to the downstream end, and the optical line with line number 11 are an optical line fourth next to the downstream end. For example, when executing optical wavelength defragmentation, the CPU 17 selects optical lines in the order of line numbers 1, 6, 12, 2, 8, 10, 3, 5, 9, 7, and 11. When optical lines indicated in the change sequence graph 60 had been selected in succession, if the selected optical lines has been successfully moved and set, the CPU 17 deletes, from the change sequence graph 60, the line numbers of the optical lines that have been successfully moved and set. For example, as processing to execute optical wavelength defragmentation by using the change sequence graph 60, the technology may be used, that is described in the paper: Yutaka Takita, Tomohiro Hashiguchi, Kazuyuki Tajima, et al. at Fujitsu Limited "Network Reconfiguration Targeting Minimum Connection Disruption", *ONDM* 2014, 19-22 May, Stockholm.

Figure 4:
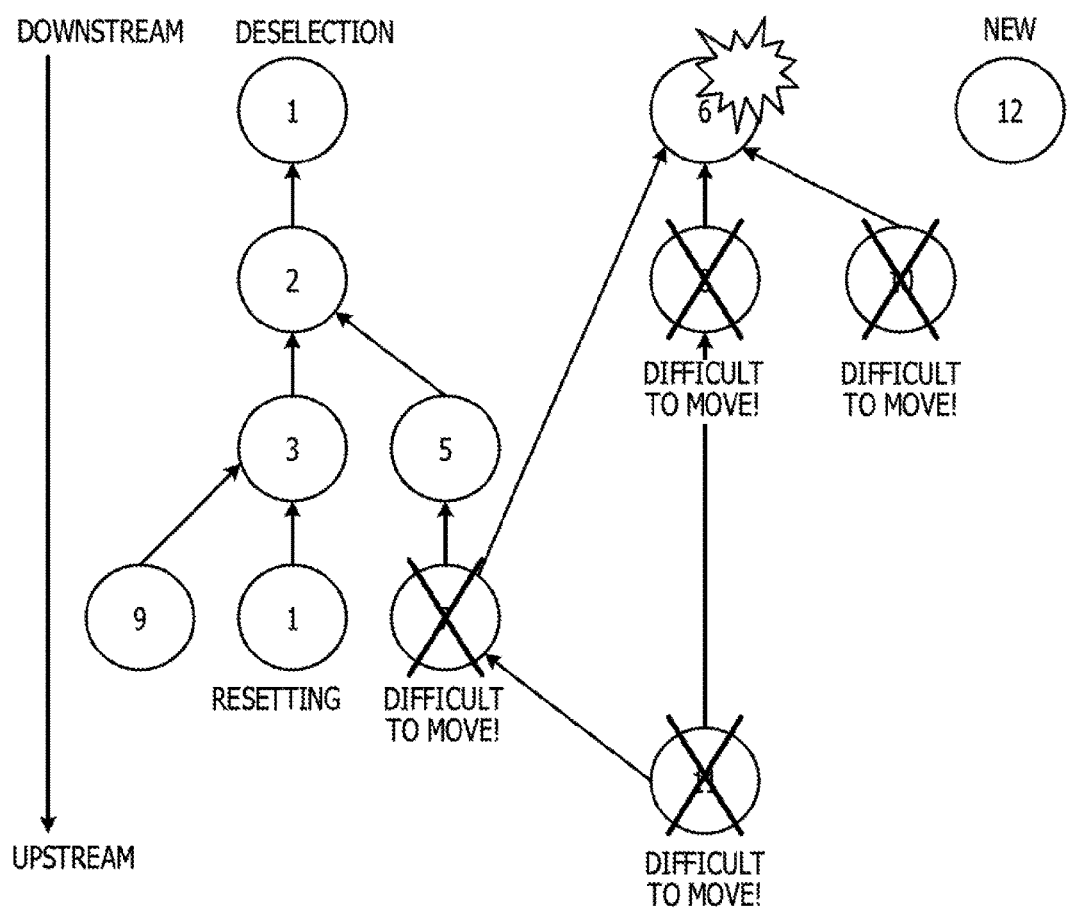
FIG. 4 illustrates an example of optical line numbers in a pending optical line list in the change sequence graph.

The current state list 24 is an area in which the change sequence graph 60 in use in defragmentation is stored. The pending optical line list 25 is an area in which the line numbers of the optical lines that failed to be moved during defragmentation and all optical lines under these optical lines are listed. FIG. 4 illustrates an example of optical line numbers in a pending optical line list in the change sequence graph. For example, assuming that the line number of an optical line that was unsuccessfully moved and set during defragmentation is 6, optical lines to be registered in the pending optical line list 25 may be the optical lines with line numbers 8, 10, 7, and 11, which are under the optical line with line number 6, besides the optical line with line number 6. The optical line numbers in the pending optical line list 25 are marked x in the change sequence graph 60.

The independent optical line list 26 is a storage area in which the line numbers of optical lines, in the change sequence graph 60, that have no dependency relationship. The optical lines indicated in the independent optical line list 26 are, for example, optical lines with line numbers 12, 10, 9, and 11 as illustrated in FIG. 3.

The CPU 17 loads the wavelength defragmentation program stored in the ROM 14 into the RAM 15 and executes a defragmentation control engine 31 and a wavelength change control engine 32 as functions. The defragmentation control engine 31 may be an engine that selects optical lines according to the change sequence graph 60 in the current state list 24. The wavelength change control engine 32 is an engine that decides whether the optical lines selected by the defragmentation control engine 31 have been successfully moved and set to optical wavelengths in slot numbers.

The defragmentation control engine 31 has a selecting unit 31A, a deciding unit 31B, and a control unit 31C. The selecting unit 31A selects downstream optical lines in succession according to the change sequence graph 60 in the current state list 24. If the selecting unit 31A selects an optical line, the control unit 31C notifies the wavelength change control engine 32 of a command to change the wavelength of the optical line.

The wavelength change control engine 32 has a change setting unit 32A and a setting deciding unit 32B. When the change setting unit 32A detects a command to change the wavelength of the selected optical line, the command being from the defragmentation control engine 31, the change setting unit 32A moves the optical line to the optical wavelength in the move-to slot number. The setting deciding unit 32B decides whether the transmission property, such as, for example, a bit error rate (BER), of the optical line that has been moved and set to its move-to optical wavelength is equal to or smaller than a predetermined threshold. If the transmission property of the optical line that has been moved and set to the move-to optical wavelength is equal to or smaller than the predetermined threshold, the setting deciding unit 32B notifies the defragmentation control engine 31 of a setting result indicating that the optical line has been successfully moved and set. If the transmission property of the optical line that has been moved and set to its move-to optical wavelength is not equal to or smaller than the predetermined threshold, the setting deciding unit 32B notifies the defragmentation control engine 31 of a setting result indicating that the optical line has been unsuccessfully moved and set.

The control unit 31C in the defragmentation control engine 31 receives a setting result about the optical line from the wavelength change control engine 32 in response to the wavelength change command. From the setting result, the deciding unit 31B decides whether the optical line has been successfully moved and set. If the deciding unit 31B decides that the optical line has been successfully moved and set, the control unit 31C completes the movement and setting of the optical line. Upon the completion of the movement and setting of the optical line, the control unit 31C updates the current state list 24, pending optical line list 25, and independent optical line list 26. Specifically, upon the completion of the movement and setting of the optical line, the control unit 31C updates the current state list 24 by deleting the line number of the optical line from the current change sequence graph 60 in the current state list 24. If the line number of the optical line that has been successfully moved and set is present in the pending optical line list 25 upon the completion of the movement and setting of the optical line, the control unit 31C updates the pending optical line list 25 by deleting, from the pending optical line list 25, the line number of the optical line that has been successfully moved and set. If the line number of the optical line that has been successfully moved and set is present in the independent optical line list 26 upon the completion of the movement and setting of the optical line, the control unit 31C updates the independent optical line list 26 by deleting, from the independent optical line list 26, the line number of the optical line that has been successfully moved and set. If, upon the completion of the movement and setting of the optical line, the control unit 31C updates the current state list 24 due to the successful movement and setting of the optical line, the control unit 31C updates the independent optical line list 26 according to the change sequence graph 60, which indicates an update of the current state list 24.

If the movement and setting of an optical line has been unsuccessful, the control unit 31C decides that it is difficult to move the optical line and updates the pending optical line list 25 by registering the line number of the optical line and the line numbers of the optical lines under that optical line. The control unit 31C also updates the independent optical line list 26 according to the update of the pending optical line list 25.

For example, the network design apparatus 5 creates the change sequence graph 60 according to the optical line allocation table in the network design information from the management apparatus 4, and registers the created change sequence graph 60 in the change sequence list 23. The network design apparatus 5 registers the change sequence graph 60, which is in the change sequence list 23, in the current state list 24. The network design apparatus 5 registers, in the independent optical line list 26, the line numbers of optical lines that have no directed edge, which are, for example, optical lines at ends, which have no dependency relationship, from the change sequence graph 60 in the current state list 24.

The defragmentation control engine 31 in the network design apparatus 5 selects optical lines in succession, starting from the optical lines indicated at the downstream end in the change sequence graph 60, after which the defragmentation control engine 31 decides whether each selected optical line can be moved to a slot number equal to or smaller than the target slot number in a span. For example, the defragmentation control engine 31 postpones the movement and setting of the optical lines indicated in the independent optical line list 26 in the change sequence graph 60.

If optical lines are indicated in neither the pending optical line list 25 nor the independent optical line list 26, the defragmentation control engine 31 selects optical lines indicated in the change sequence graph 60 in succession, starting from the optical lines indicated at the downstream end. If selectable, non-selected optical lines are indicated in the pending optical line list 25, the defragmentation control engine 31 selects these optical lines in succession, starting from the optical lines indicated at the downstream end in the pending optical line list 25. If there are no more selectable, non-selected optical lines due to the successive selection of optical lines indicated in the pending optical line list 25, the defragmentation control engine 31 selects optical lines that are registered in neither the pending optical line list 25 nor the independent optical line list 26 in succession, starting from the optical lines indicated at the downstream end in the change sequence graph 60. The defragmentation control engine 31 selects optical lines that are registered in neither the pending optical line list 25 nor the independent optical line list 26 in succession. When there are no more selectable, non-selected optical lines, if selectable optical lines are indicated in the independent optical line list 26, the defragmentation control engine 31 selects optical lines in a maximum number of spans in succession from the independent optical line list 26.

Figure 5A:
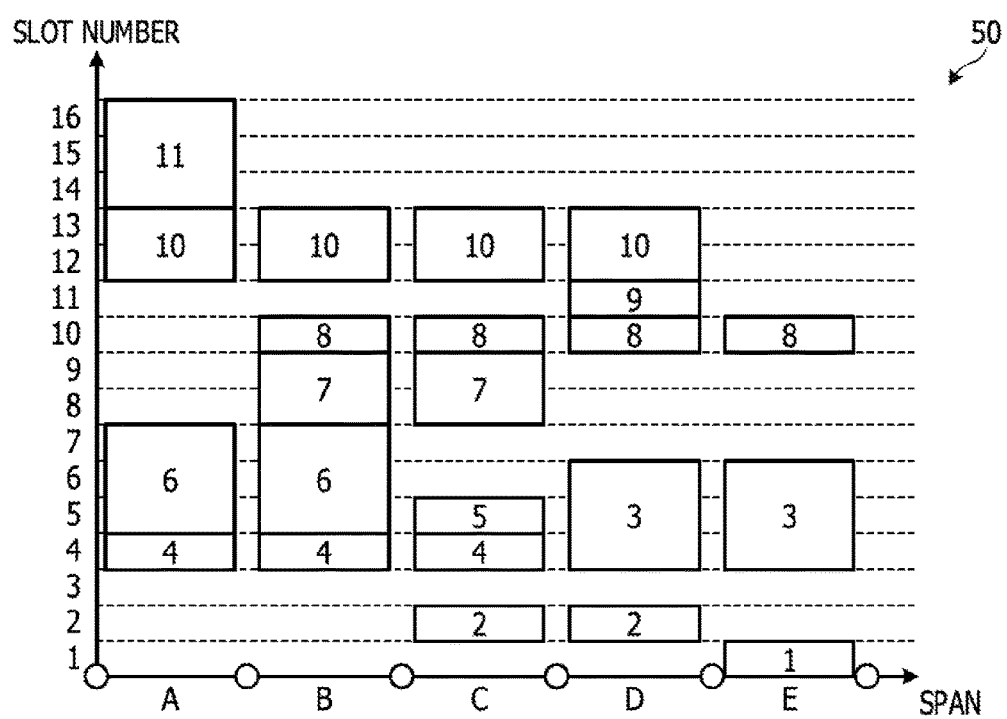
FIGS. 5A to 5D illustrate examples of optical line allocation tables involved in a defragmentation operation.

FIGS. 5A to 5D and FIGS. 6A to 6C illustrate examples of optical line allocation tables involved in a defragmentation operation. The optical line allocation table 50 illustrated in FIG. 5A is the optical line allocation table 50 before a defragmentation starts. In the optical line allocation table 50, the optical line with line number 1 is allocated to the optical wavelength at slot number 1 in span E, and the optical line with line number 2 is allocated to the optical wavelength at slot number 2 in spans C and D. In the optical line allocation table 50, the optical line with line number 3 is allocated to the optical wavelengths at slot numbers 4, 5, and 6 in spans D and E, and the optical line with line number 4 is allocated to the optical wavelength at slot number 4 in spans A, B, and C. In the optical line allocation table 50, the optical line with line number 5 is allocated to the optical wavelength at slot number 5 in span C, and the optical line with line number 6 is allocated to the optical wavelengths at slot numbers 5, 6, and 7 in spans A and B. In the optical line allocation table 50, the optical line with line number 7 is allocated to the optical wavelengths at slot numbers 8 and 9 in spans B and C, and the optical line with line number 8 is allocated to the optical wavelength at slot number 10 in spans B, C, D, and E. In the optical line allocation table 50, the optical line with line number 9 is allocated to the optical wavelength at slot number 11 in span D, and the optical line with line number 10 is allocated to the optical wavelengths at slot numbers 12 and 13 in spans A, B, C, and D. In the optical line allocation table 50, the optical line with line number 11 is allocated to the optical wavelengths at slot numbers 1, 15, and 16 in span A.

Figure 5B:
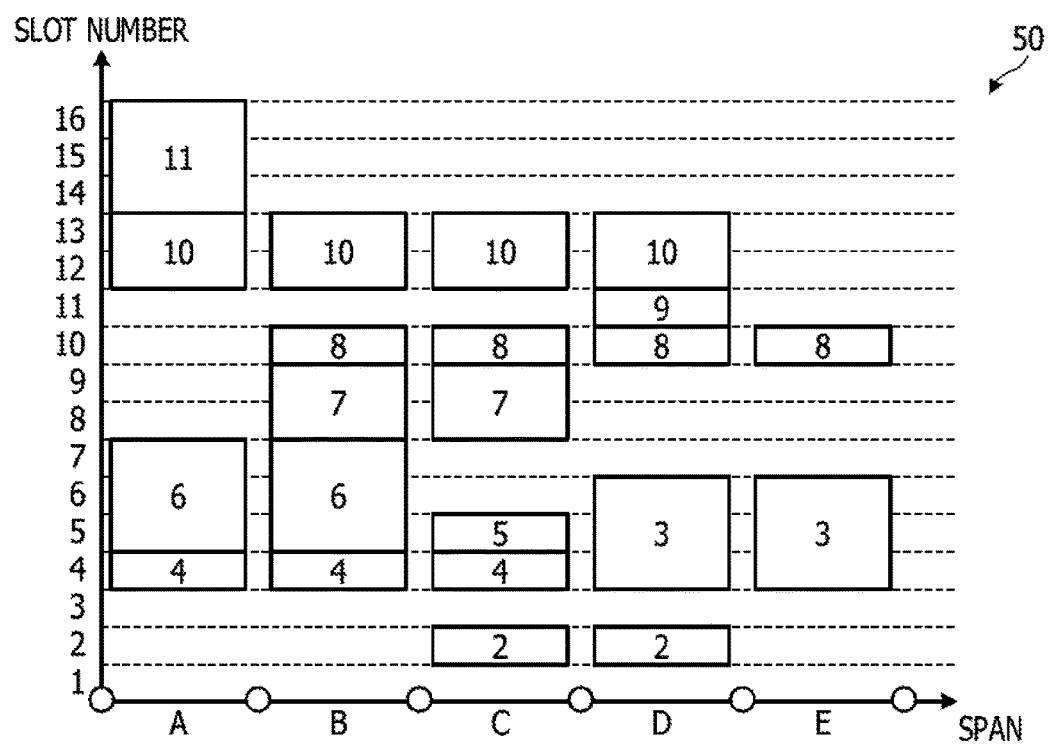

According to the change sequence graph 60 in FIG. 3, since the optical wavelength with line number 1 at slot number 1 in span E is at the downstream end, the defragmentation control engine 31 temporarily deletes the optical line with line number 1 as illustrated in FIG. 5B. When executing optical wavelength defragmentation for the first time, the defragmentation control engine 31 deletes the optical lines indicated at the downstream end to secure a move-to optical wavelength. For example, after deleting the optical line with line number 1, the defragmentation control engine 31 selects the next optical line with line number 6 and decides that it is difficult to move the optical line with line number 6. When the defragmentation control engine 31 decides that it is difficult to move the optical line with line number 6, the defragmentation control engine 31 registers the optical lines with line numbers 6, 8, 10, 7, and 11 in the pending optical line list 25.

Figure 5C:
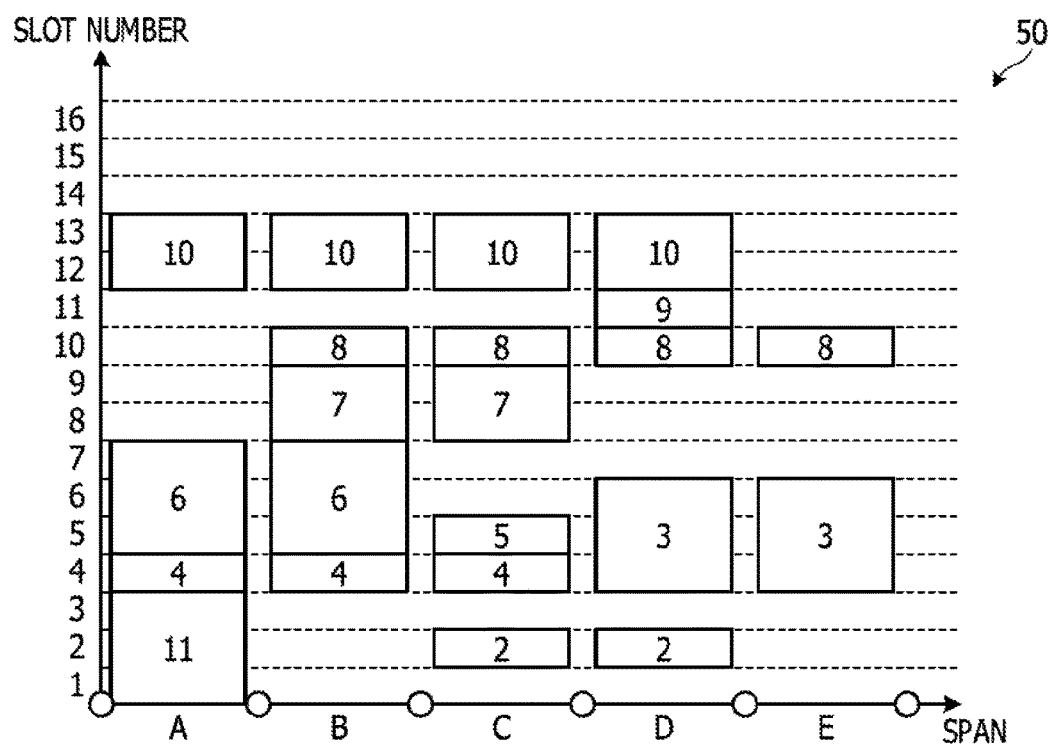

The defragmentation control engine 31 optical lines selects the optical lines with line numbers 6, 8, 10, 7, and 11 in that order in succession according to the pending optical line list 25, starting from the optical line indicated at the downstream end. Then, the defragmentation control engine 31 acquires a setting result of movement and setting from the wavelength change control engine 32 for each selected optical line. For example, the defragmentation control engine 31 acquires a setting result indicating that the optical line with line number 11 has been successfully moved and set to the optical wavelengths at slot numbers 1, 2, and 3 in span A. The defragmentation control engine 31 moves the optical line with line number 11 in span A from slot numbers 14, 15, and 16 to the optical wavelengths at slot numbers 1, 2, and 3, as illustrated in FIG. 5C. Upon the completion of the movement and setting of the optical line with line number 11, the defragmentation control engine 31 deletes line number 11 of the optical line from the pending optical line list 25 and current state list 24.

Figure 5D:
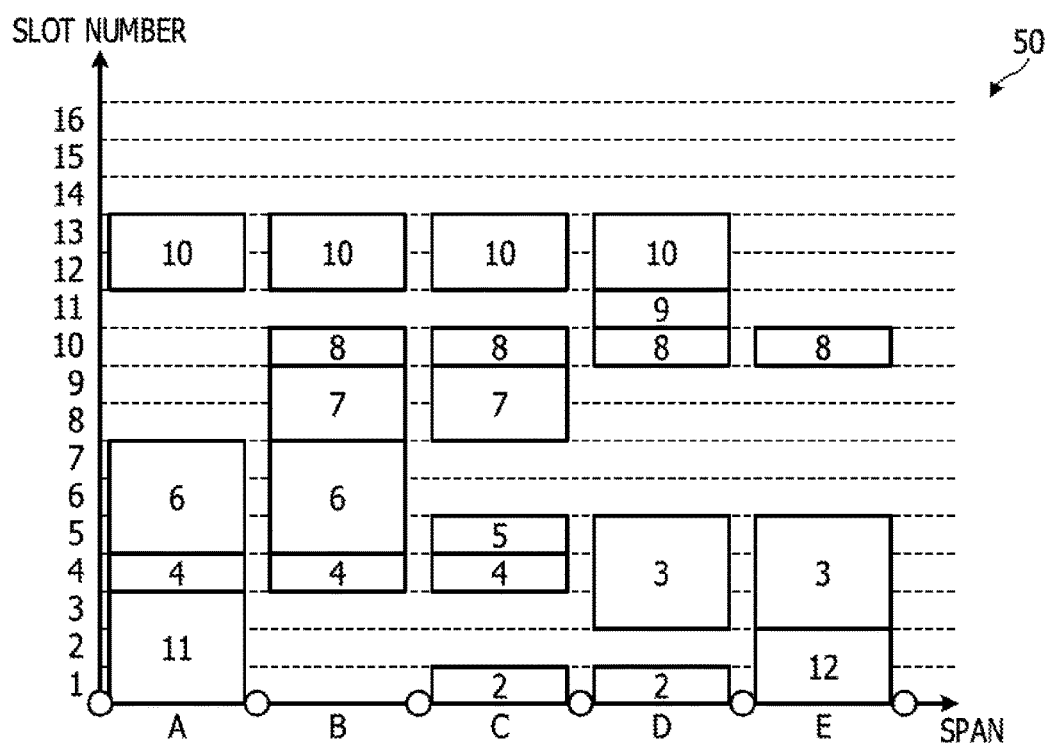

For example, the defragmentation control engine 31 selects all optical lines indicated in the pending optical line list 25 in succession, and if it is difficult to move and set all these optical lines, selects the optical line with line number 2, which is registered in neither the pending optical line list 25 nor the independent optical line list 26 and is indicated at the downstream end in the change sequence graph 60. For example, the defragmentation control engine 31 acquires a setting result indicating that the optical line with line number 2 has been successfully moved and set to the optical wavelength at slot number 1 in spans C and D. As a result, when the defragmentation control engine 31 acquires a setting result indicating that the optical line with line number 2 has been successfully moved and set, the defragmentation control engine 31 moves the optical line with line number 2 from slot number 2 in spans C and D to the optical wavelength at slot number 1, as illustrated in FIG. 5D. Upon the completion of the movement and setting of the optical line with line number 2, the defragmentation control engine 31 deletes line number 2 of the optical line from the change sequence graph 60 in the current state list 24. Since line number 2 of the optical line has been deleted from the change sequence graph 60 in the current state list 24, the defragmentation control engine 31 registers the optical line with line number 5 in the independent optical line list 26.

The defragmentation control engine 31 selects all optical lines indicated in the pending optical line list 25 in succession, and if it is difficult to move all these optical lines, selects the optical line with line number 3, which is registered in neither the pending optical line list 25 nor the independent optical line list 26 and is indicated at the downstream end in the change sequence graph 60. For example, the defragmentation control engine 31 acquires a setting result indicating that the optical line with line number 3 has been successfully moved and set to the optical wavelengths at slot numbers 3, 4, and 5 in spans D and E. When the defragmentation control engine 31 acquires a setting result indicating that the optical line with line number 3 has been successfully moved and set, the defragmentation control engine 31 moves the optical line with line number 3 from slot numbers 4, 5, and 6 in spans D and E to the optical wavelengths at slot numbers 3, 4, and 5, as illustrated in FIG. 5D. Upon the completion of the movement and setting of the optical line with line number 3, the defragmentation control engine 31 deletes line number 3 of the optical line from the current state list 24.

The defragmentation control engine 31 selects all optical lines indicated in the pending optical line list 25 in succession, and if it is difficult to move and set all these optical lines, decides that there are no more optical lines that are registered in neither the pending optical line list 25 nor the independent optical line list 26. The defragmentation control engine 31 selects the optical line with line number 12 at the downstream end in the independent optical line list 26. The defragmentation control engine 31 acquires a setting result indicating that the optical line with line number 12 has been successfully moved and set to the optical wavelengths at slot numbers 1 and 2 in span E. As a result, when the defragmentation control engine 31 acquires a setting result indicating that the optical line with line number 12 has been successfully moved and set, the defragmentation control engine 31 moves the optical line with line number 12 to the optical wavelengths at slot numbers 1 and 2 in span E, as illustrated in FIG. 5D. Upon the completion of the movement and setting of the optical line with line number 12, the defragmentation control engine 31 deletes line number 12 of the optical line from the current state list 24 and independent optical line list 26.

Figure 6A:
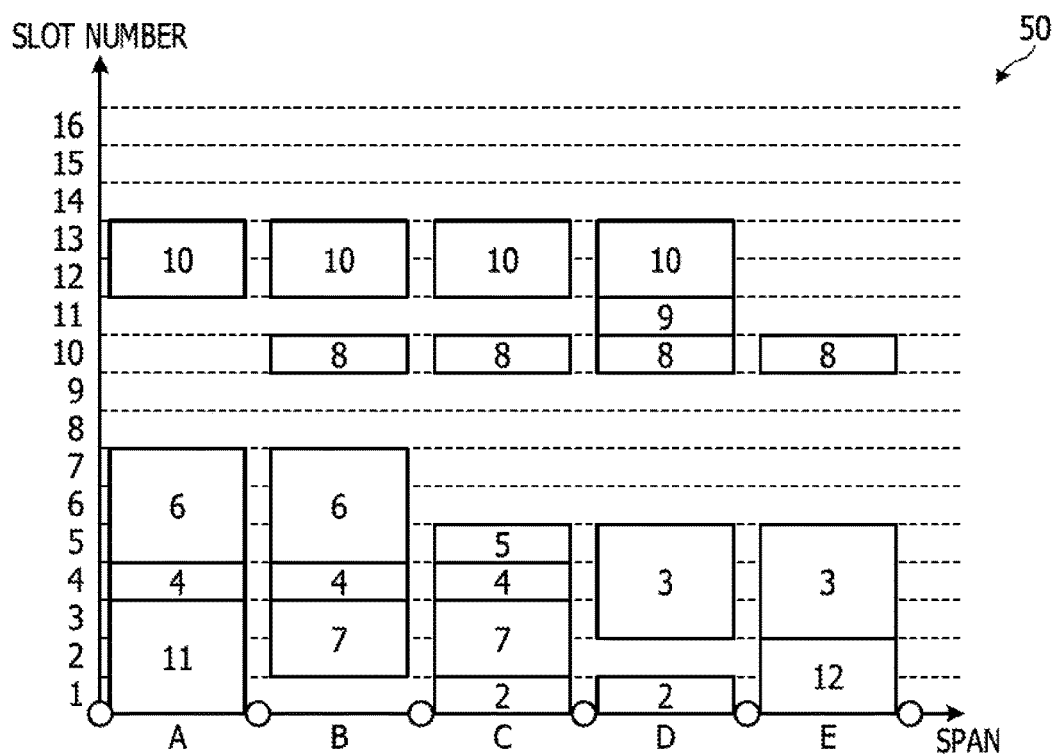
FIGS. 6A to 6C illustrate examples of optical line allocation tables involved in a defragmentation operation.

The defragmentation control engine 31 selects selectable optical lines indicated in the pending optical line list 25 in succession, and if it is difficult to move and set the optical lines with line numbers 6, 8, and 10, selects the optical line with line number 7 in the pending optical line list 25. The defragmentation control engine 31 acquires a setting result indicating that the optical line with line number 7 has been successfully moved and set to the optical wavelengths at slot numbers 2 and 3 in spans B and C. As a result, when the defragmentation control engine 31 acquires a setting result indicating that the optical line with line number 7 has been successfully moved and set, the defragmentation control engine 31 moves the optical line with line number 7 from slot numbers 8 and 9 in spans B and C to the optical wavelengths at slot numbers 2 and 3, as illustrated in FIG. 6A. Upon the completion of the movement and setting of the optical line with line number 7, the defragmentation control engine 31 deletes line number 7 of the optical line from the change sequence graph 60 and pending optical line list 25.

Figure 6B:
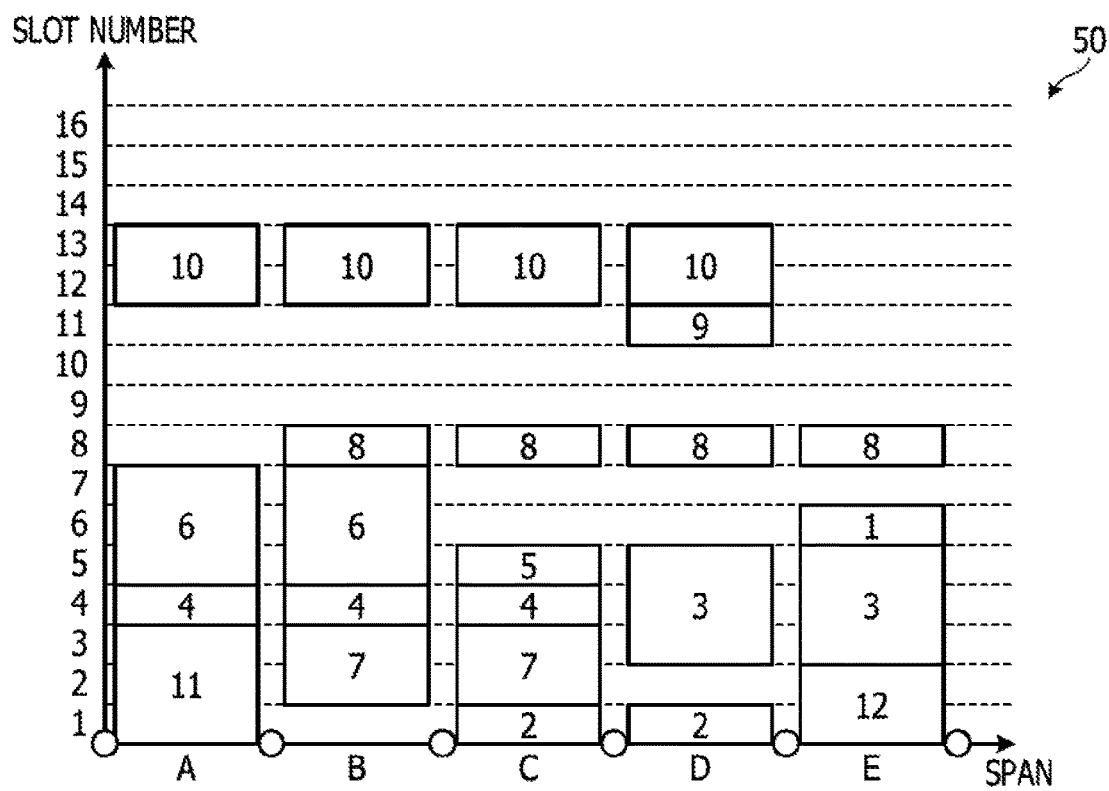

The defragmentation control engine 31 selects selectable optical lines indicated in the pending optical line list 25 in succession, and if it is difficult to move and set the optical line with line number 6, selects the optical line with line number 8 in the pending optical line list 25. The defragmentation control engine 31 acquires a setting result indicating that the optical line with line number 8 has been successfully moved and set to the optical wavelength at slot number 8 in spans B, C, D, and E. As a result, when the defragmentation control engine 31 acquires a setting result indicating that the optical line with line number 8 has been successfully moved and set, the defragmentation control engine 31 moves the optical line with line number 8 from slot number 10 in spans B, C, D, and E to the optical wavelength at slot number 8, as illustrated in FIG. 6B. Upon the completion of the movement and setting of the optical line with line number 8, the defragmentation control engine 31 deletes line number 8 of the optical line from the change sequence graph 60 and pending optical line list 25.

Figure 6C:
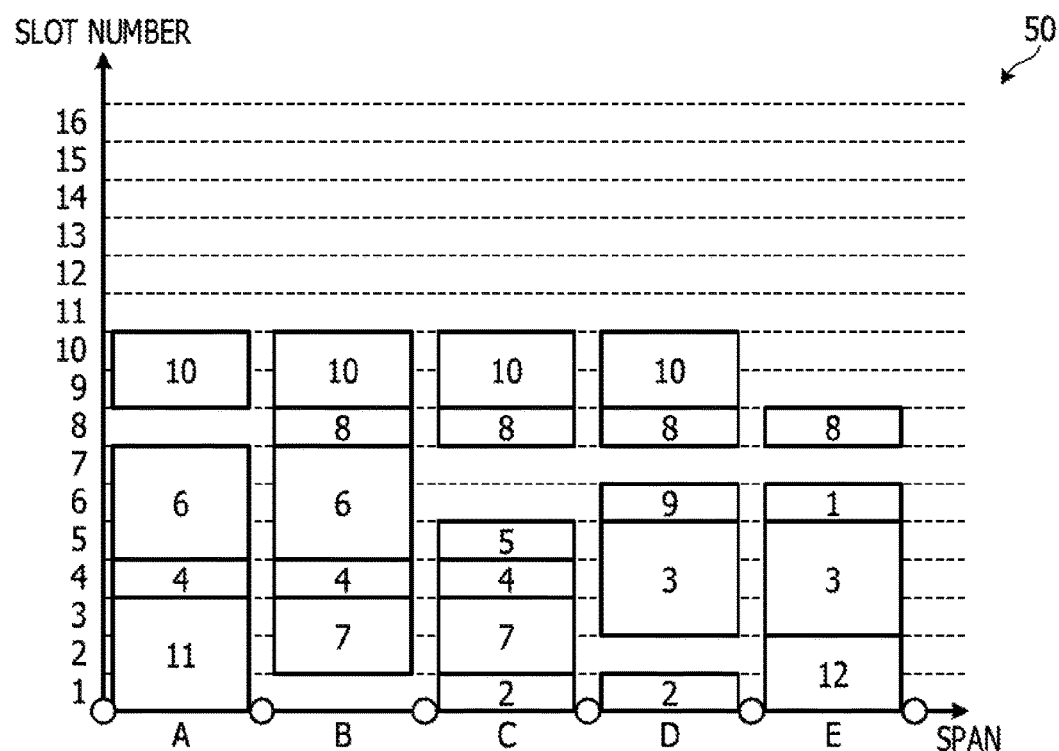

The defragmentation control engine 31 selects selectable optical lines indicated in the pending optical line list 25 in succession and selects the optical line with line number 10. The defragmentation control engine 31 acquires a setting result indicating that the optical line with line number 10 has been successfully moved and set to the optical wavelengths at slot numbers 9 and 10 in spans A, B, C, and D. When the defragmentation control engine 31 acquires a setting result indicating that the optical line with line number 10 has been successfully moved and set, the defragmentation control engine 31 moves the optical line with line number 10 from slot numbers 12 and 13 in spans A, B, C, and D to the optical wavelengths at slot numbers 9 and 10, as illustrated in FIG. 6C. Upon the completion of the movement and setting of the optical line with line number 10, the defragmentation control engine 31 deletes line number 10 of the optical line from the change sequence graph 60 and pending optical line list 25.

If it is difficult to move each optical line indicated in the pending optical line list 25 or there is no optical line that is registered in neither the pending optical line list 25 nor the independent optical line list 26, the defragmentation control engine 31 decides whether a non-selected optical line is indicated in the independent optical line list 26. The defragmentation control engine 31 selects a non-selected optical line indicated in the independent optical line list 26, which is, for example, the optical line with line number 9. The defragmentation control engine 31 acquires a setting result indicating that the optical line with line number 9 has been successfully moved and set to the optical wavelength at slot number 6 in span D. As a result, when the defragmentation control engine 31 acquires a setting result indicating that the optical line with line number 9 has been successfully moved and set, the defragmentation control engine 31 moves the optical line with line number 9 from slot number 11 in span D to the optical wavelength at slot number 6, as illustrated in FIG. 6C. Upon the completion of the movement and setting of the optical line with line number 9, the defragmentation control engine 31 deletes line number 9 of the optical line with the change sequence graph 60 and pending optical line list 25.

If it is difficult to move each optical line indicated in the pending optical line list 25 or there is no optical line that is registered in neither the pending optical line list 25 nor the independent optical line list 26, the defragmentation control engine 31 decides whether a non-selected optical line is indicated in the independent optical line list 26. If no non-selected optical line is indicated in the independent optical line list 26, the defragmentation control engine 31 moves the optical line with line number 1, which was deleted first at the start of defragmentation, to slot number 6 in span E, as illustrated in FIG. 6C.

As a result, in the defragmentation control engine 31, wavelength defragmentation is executed from the optical line allocation table 50 in FIG. 5A to the optical line allocation table 50 in FIG. 6C. The defragmentation control engine 31 may reduce fragmentation from 16 slots to 10 slots and may secure a free band at slot numbers 11 to 16.

Figure 7:
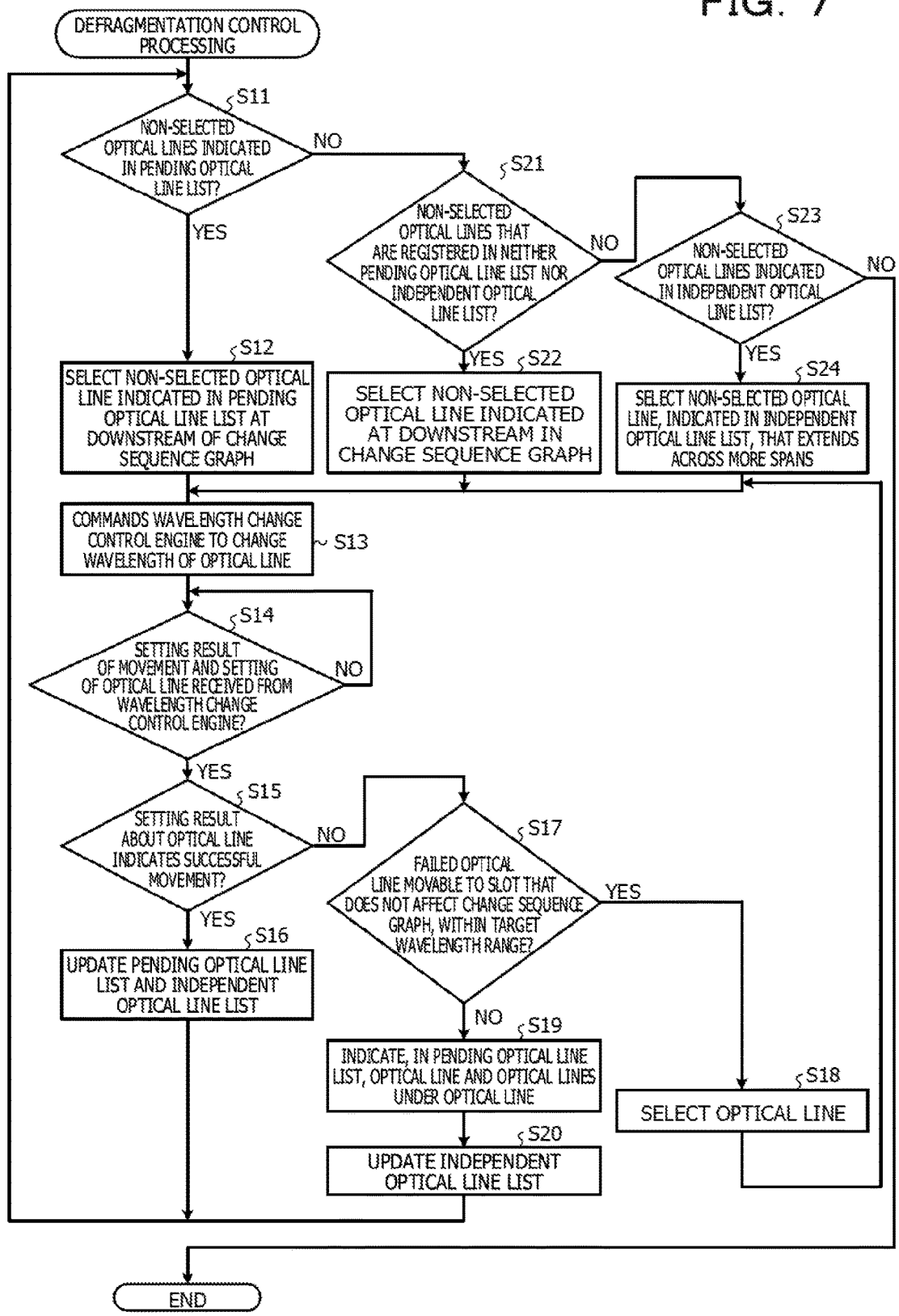
FIG. 7 illustrates an example of defragmentation control processing.

FIG. 7 illustrates an example of defragmentation control processing. Defragmentation control processing in FIG. 7 may be executed by the CPU 17 in the network design apparatus 5 illustrated in FIG. 1. In defragmentation control processing in FIG. 7, optical lines are selected in succession according to the change sequence graph 60, and optical wavelength defragmentation is executed for each optical line according to the setting result of the movement and setting of the selected optical line. In FIG. 7, the defragmentation control engine 31 in the CPU 17 decides whether non-selected optical lines are indicated in the pending optical line list 25 (operation S11). If non-selected optical lines are indicated in the pending optical line list 25 (the decision in operation S11 is affirmative), the defragmentation control engine 31 selects a non-selected optical line indicated at the downstream in the pending optical line list 25 (operation S12).

The defragmentation control engine 31 commands the wavelength change control engine 32 to change the wavelength of the selected optical line (operation S13). The wavelength change control engine 32 moves and sets the optical line selected by the defragmentation control engine 31 to the optical wavelength at its move-to slot number in a span, and notifies the defragmentation control engine 31 of a setting result, according to which whether the optical line has been successfully moved and set is decided.

The defragmentation control engine 31 decides whether the setting result of the movement and setting of the selected optical line has been received from the wavelength change control engine 32 (operation S14). If the defragmentation control engine 31 has received the setting result (the decision in operation S14 is affirmative), the defragmentation control engine 31 decides whether the optical line has been successfully moved and set to its move-to optical wavelength (operation S15). If the optical line has been successfully moved and set to the move-to optical wavelength (the decision in operation S15 is affirmative), the defragmentation control engine 31 updates the current state list 24, pending optical line list 25, and independent optical line list 26 (operation S16). To have the defragmentation control engine 31 decide whether non-selected optical lines are indicated in the pending optical line list 25, processing proceeds to operation S11. As a result, non-selected optical lines indicated in the pending optical line list 25 are selected in succession, preferentially starting from downstream optical lines.

If the movement and setting has been unsuccessful (the decision in operation S15 is negative), the defragmentation control engine 31 decides whether, within the target wavelength range, the optical line that has been unsuccessfully moved and set can be moved to an optical wavelength at a slot number that does not affect the change sequence graph 60 (operation S17). If the optical line that has been unsuccessfully moved and set can be moved (the decision in operation S17 is affirmative), the defragmentation control engine 31 selects the optical line (operation S18). To command the wavelength change control engine 32 to change the wavelength of the optical line, processing proceeds to S13.

If it is difficult to move the optical line that has been unsuccessfully moved and set (the decision in operation S17 is negative), the defragmentation control engine 31 registers, in the pending optical line list 25, the optical line that has been unsuccessfully moved and set and all optical lines under the optical line indicated in the change sequence graph 60 (operation S19). The defragmentation control engine 31 updates the independent optical line list 26 and current state list 24 according to the update of the pending optical line list 25 (operation S20). To decide whether non-selected optical lines are indicated in the pending optical line list 25, processing proceeds to operation S11. If the defragmentation control engine 31 has not received a setting result (the decision in operation S14 is negative), to decide whether a setting result of the movement and setting of the optical line has been received, processing proceeds to operation S14.

If no non-selected optical line is indicated in the pending optical line list 25 (the decision in operation S11 is negative), the defragmentation control engine 31 decides whether there are non-selected optical lines that are registered in neither the pending optical line list 25 nor the independent optical line list 26 (operation S21). If there are non-selected optical lines that are registered in neither the pending optical line list 25 nor the independent optical line list 26 (the decision in operation S21 is affirmative), the defragmentation control engine 31 selects a non-selected optical line indicated at the downstream in the change sequence graph 60 (operation S22). To have the defragmentation control engine 31 command the wavelength change control engine 32 to change the wavelength of the optical line, processing proceeds to S13. The defragmentation control engine 31 selects non-selected optical lines indicated in the pending optical line list 25 and independent optical line list 26 in succession, preferentially starting from downstream optical lines.

If there is no non-selected optical line that is registered in neither the pending optical line list 25 and nor the independent optical line list 26 (the decision in operation S21 is negative), the defragmentation control engine 31 decides whether non-selected optical lines are indicated in the independent optical line list 26 (operation S23). If non-selected optical lines are indicated in the independent optical line list 26 (the decision in operation S23 is affirmative), the defragmentation control engine 31 selects a non-selected optical line, indicated in the independent optical line list 26, that extends across more spans (operation S24). To have the defragmentation control engine 31 command the wavelength change control engine 32 to change the wavelength of the optical line, processing proceeds to S13. If no non-selected optical lines is indicated in the independent optical line list 26 (the decision in operation S23 is negative), the processing operation illustrated in FIG. 7 is terminated.

The defragmentation control engine 31, which executes defragmentation control processing illustrated in FIG. 7, selects optical lines indicated in the pending optical line list 25, preferentially starting from downstream optical lines indicated in the change sequence graph 60. If the selected optical line has been successfully moved and set to its move-to optical wavelength, the defragmentation control engine 31 completes the movement and setting (defragmentation) of the optical line to the move-to optical wavelength. As a result, the defragmentation control engine 31 may preferentially defragment optical lines having a dependency relationship with optical lines that is difficult to move.

If no non-selected optical line is indicated in the pending optical line list 25, the defragmentation control engine 31 selects optical lines that are registered in neither the pending optical line list 25 nor the independent optical line list 26, starting from downstream optical lines indicated in the change sequence graph 60. If the selected optical line has been successfully moved and set to its move-to optical wavelength, the defragmentation control engine 31 completes the movement and setting (defragmentation) of the optical line to the move-to optical wavelength. As a result, if no non-selected optical line is indicated in the pending optical line list 25, the defragmentation control engine 31 may preferentially defragment optical lines other than the optical lines indicated in the pending optical line list 25 and independent optical line list 26.

If no non-selected optical line is included in optical lines that are registered in neither the pending optical line list 25 nor the independent optical line list 26, the defragmentation control engine 31 selects optical lines indicated in the independent optical line list 26, starting from optical lines that extend across more spans. If the selected optical line has been successfully moved and set to its move-to optical wavelength, the defragmentation control engine 31 completes the movement and setting (defragmentation) of the optical line to the move-to optical wavelength. As a result, if no non-selected optical line is included in optical lines that are not registered in neither the pending optical line list 25 nor the independent optical line list 26, the defragmentation control engine 31 may defragment optical lines indicated in the independent optical line list 26.

If it is difficult to move and set an optical line to its move-to optical wavelength, the defragmentation control engine 31 stops the selection of the optical line, the selection being performed according to the change sequence graph 60, and registers, in the pending optical line list 25, the optical line that is difficult to move and set and the optical lines under that optical line. As a result, if it is difficult to move and set an optical line to its move-to optical wavelength, the defragmentation control engine 31 may register, in the pending optical line list 25, the optical line that is difficult to move and the optical lines having a dependency relationship with that optical line.

Figure 8:
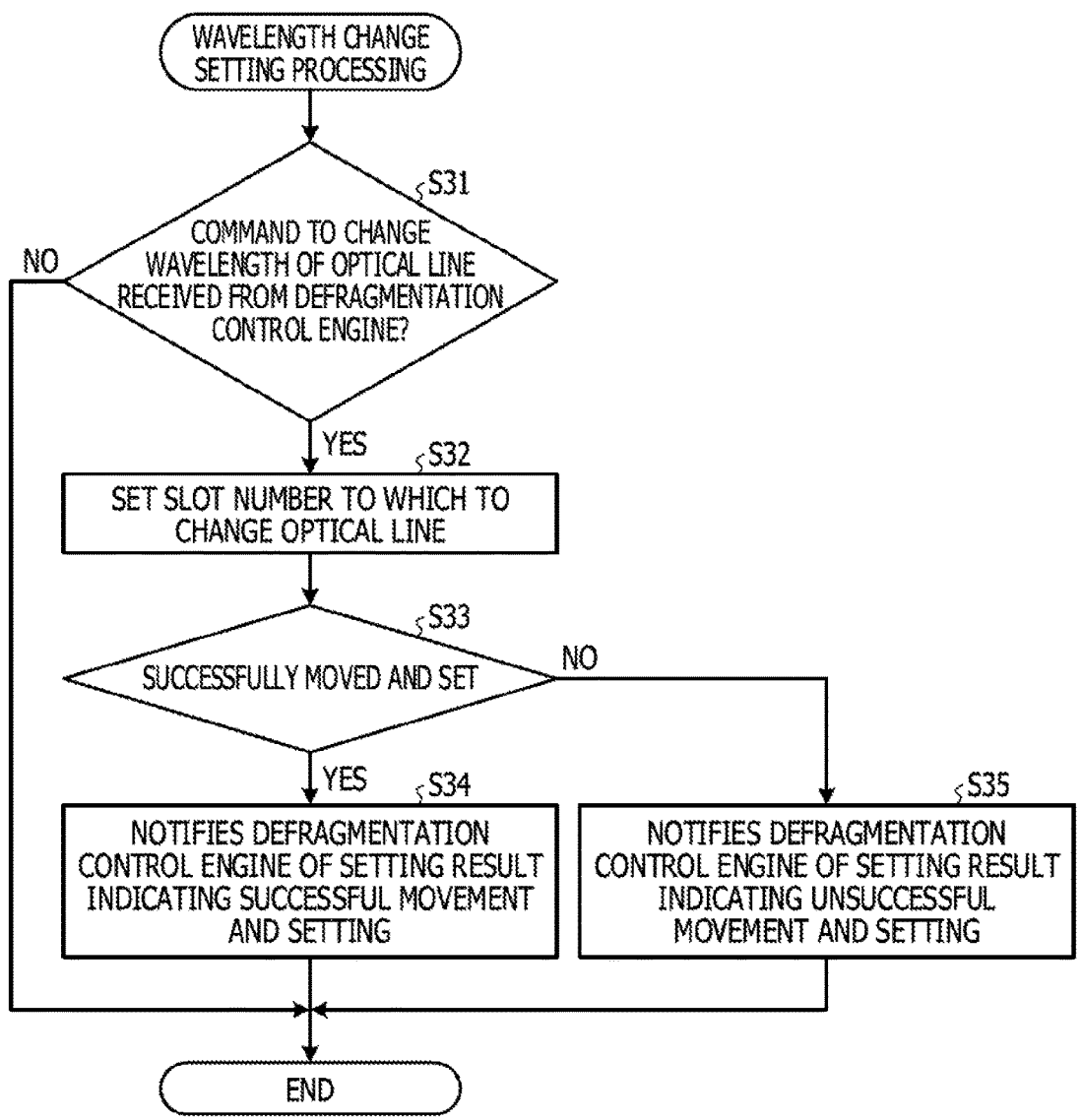
FIG. 8 illustrates an example of wavelength change setting processing.

FIG. 8 illustrates an example of wavelength change setting processing. Wavelength change setting processing in FIG. 8 may be executed by the CPU 17 in the network design apparatus 5 illustrated in FIG. 1. In wavelength change setting processing, if a command to change the wavelength of an optical line is detected, the optical line is moved and set to its move-to optical wavelength in a span, after which the defragmentation control engine 31 is notified of a setting result indicating whether the optical line has been successfully moved and set to the move-to optical wavelength. In FIG. 8, the wavelength change control engine 32 decides whether it has received a command to change the wavelength of an optical line from the defragmentation control engine 31 (operation S31). If the wavelength change control engine 32 has received a command to change the wavelength of the optical line (the decision in operation S31 is affirmative), the wavelength change control engine 32 changes and sets the optical line to its move-to optical wavelength in a span (operation S32). After having changed and set the optical line to the move-to optical wavelength, the wavelength change control engine 32 decides whether the optical line has been successfully moved and set to the move-to optical wavelength (operation S33).

If the optical line has been successfully moved and set to the move-to optical wavelength (the decision in operation S33 is affirmative), the wavelength change control engine 32 notifies the defragmentation control engine 31 of a setting result indicating that the optical line has been successfully moved and set to the move-to optical wavelength (operation S34) and the processing operation in FIG. 8 is terminated.

If the optical line has been unsuccessfully moved and set to the move-to optical wavelength (the decision in operation S33 is negative), the wavelength change control engine 32 notifies the defragmentation control engine 31 of a setting result indicating that the optical line has been unsuccessfully moved and set to the move-to optical wavelength (operation S35) and the processing operation in FIG. 8 is terminated. If the wavelength change control engine 32 has not received a command to change the wavelength of an optical line (the decision in operation S31 is negative), the processing operation in FIG. 8 is terminated.

The wavelength change control engine 32, which executes wavelength change setting processing in FIG. 8, moves and sets an optical line to its move-to optical wavelength in response to a command to change the wavelength of an optical line, the wavelength change control engine 32 having been notified of the command by the defragmentation control engine 31, after which the wavelength change control engine 32 decides whether the optical line has been successfully moved and set to the move-to optical wavelength. If the optical line has been successfully moved and set to the move-to optical wavelength, the wavelength change control engine 32 notifies the defragmentation control engine 31 of a successful setting result. As a result, the wavelength change control engine 32 notifies the defragmentation control engine 31 of a successful setting result.

If the optical line has been unsuccessfully moved and set to the move-to optical wavelength, the wavelength change control engine 32 notifies the defragmentation control engine 31 of an unsuccessful setting result. As a result, the wavelength change control engine 32 notifies the defragmentation control engine 31 of an unsuccessful setting result.

If it is difficult to move and set an optical line to its move-to optical wavelength, the network design apparatus 5 stops the selection of the optical line, the selection being performed according to the change sequence graph 60, and selects an optical line that is one of optical lines on the optical network 3 and is indicated in the pending optical line list 25. As a result, if it is difficult to move and set an optical line to its move-to optical wavelength, the network design apparatus 5 preferentially selects an optical line indicated in the pending optical line list 25. Therefore, a time taken for wavelength defragmentation may be shortened while the wavelength defragmentation is kept at high precision.

For example, under a situation in which work to perform wavelength defragmentation is suspended, if control is temporarily stopped and is resumed after an existing wavelength defragmentation design is executed, it may be difficult to predict a time at which a suspension occurs and a plurality of suspensions may. If a process temporarily stops control and executes a design calculation each time a suspension occurs, an immense time may be taken until the work to perform wavelength defragmentation is completed. In the technology described above, for example, wavelength defragmentation may be achieved in which the number of optical lines to be changed is minimized without optimality being impaired. Although an improvement effect may be affected depending on the number of suspensions that will occur, the size of the optical network 3, and other factors, two designs may be involved in one suspension. In the technology described above, only one design is enough, so even if a case is assumed in which a plurality of suspensions will occur, work time may be reduced at least by a factor of two.

If it is difficult to move and set an optical line to its move-to optical wavelength, the network design apparatus 5 indicates, in the pending optical line list 25, the optical line that is difficult to move and set and the optical lines having a dependency relationship with that optical line as indicated in the change sequence graph 60. As a result, the network design apparatus 5 acquires the pending optical line list 25, which is used to preferentially select optical lines having a dependency relationship with an optical line that is difficult to move.

If selectable optical lines are indicated in the pending optical line list 25, the network design apparatus 5 selects optical lines, preferentially starting from optical lines indicated in the pending optical line list 25. As a result, the network design apparatus 5 preferentially selects optical lines indicated in the pending optical line list 25.

If no selectable optical line is indicated in the pending optical line list 25, the network design apparatus 5 selects optical lines other than the optical lines indicated in the pending optical line list 25 and independent optical line list 26. As a result, if no more selectable optical lines are indicated in the pending optical line list 25, the network design apparatus 5 preferentially selects optical lines that are registered in neither the pending optical line list 25 nor the independent optical line list 26.

If there is no selectable optical line that is registered in neither the pending optical line list 25 nor the independent optical line list 26, the network design apparatus 5 selects optical lines from the independent optical line list 26. As a result, the network design apparatus 5 selects optical lines indicated in the independent optical line list 26.

If an optical line has been moved to its move-to optical wavelength and the transmission property of an optical line having an optical wavelength adjacent to the moved-to optical wavelength of that optical line has been deteriorated to a predetermined level, the network design apparatus 5 decides that it is difficult to move and set the optical line that has been moved to the move-to optical wavelength. As a result, according to the transmission property of the optical line with the optical wavelength adjacent to the move-to optical wavelength, the network design apparatus 5 decides that it is difficult to move the optical line to the move-to optical wavelength.

The network design apparatus 5 acquires network design information from the management apparatus 4 and creates the change sequence graph 60 according to the network design information. For example, the network design apparatus 5 may acquire the change sequence graph 60 from the management apparatus 4. The network design apparatus 5 may be separated from the management apparatus 4 or may be integrated with the management apparatus 4.

In the setting deciding unit 32B in the wavelength change control engine 32, when an optical line has been moved and set to its move-to optical wavelength, a BER is used as the transmission property of the optical line with the optical wavelength adjacent to the move-to optical wavelength of that optical line. However, the transmission property is not limited to a BER.

If the transmission property of an optical line has been deteriorated to a predetermined level, the setting deciding unit 32B decides that it is difficult to move and set, to its move-to optical wavelength, an optical line that has caused the deterioration of the transmission property. Even if, for example, the number of slots used by an optical line is smaller than the number of slots corresponding to the move-to optical wavelength of the optical line, the setting deciding unit 32B may decide that it is difficult to move and set the optical line to the move-to optical wavelength.

The physical layouts of the constituent elements in each unit illustrated in the drawings may not be limited to the physical layouts illustrated in the drawings. For example, all or part of these units may be functionally or physically separated or integrated in arbitrary units, depending on various loads, the usage status, and the like.

All or any part of processing functions executed in each unit may be executed by a CPU (or a microprocessing unit (MPU), a microcontroller unit (MCU), or another microcomputer). All or any part of the processing functions may be executed by programs that are analyzed and executed by the CPU (or an MPU, an MCU, or another microcomputer) or wired-logic hardware.

Figure 9:
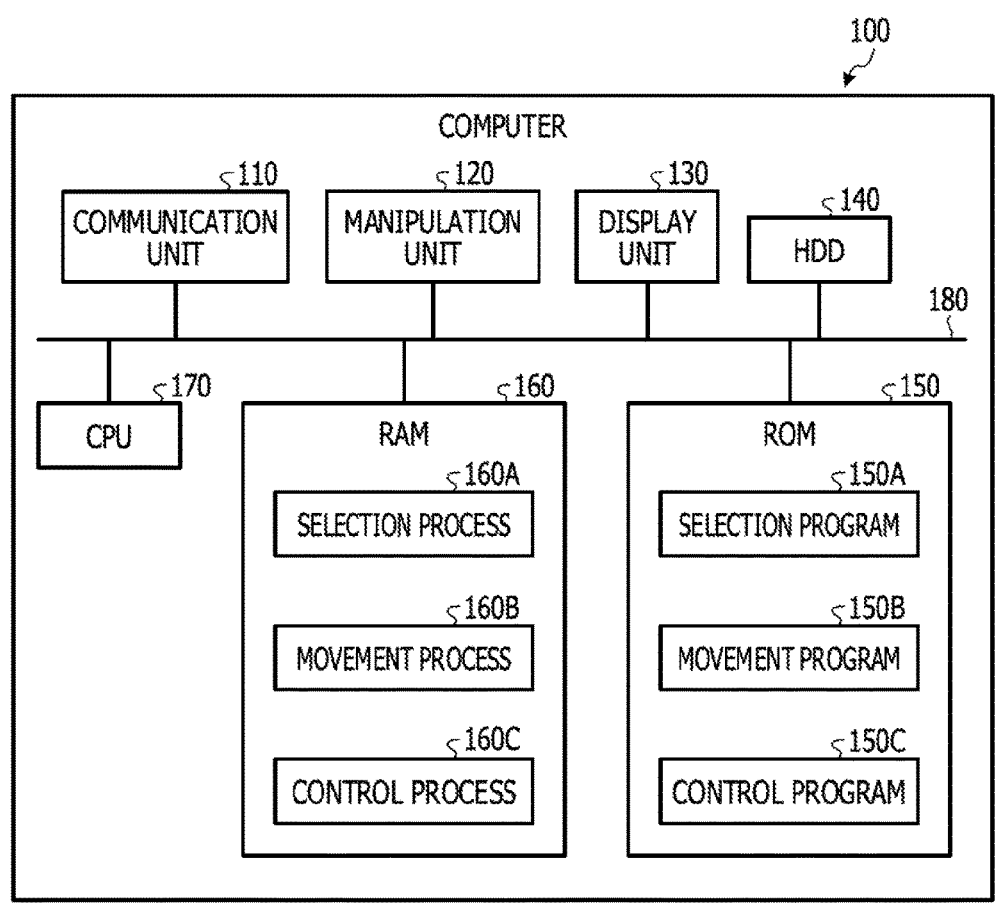
FIG. 9 illustrates an example of a computer that executes a wavelength defragmentation program.

Various types of processing described above is implemented by using a computer to execute programs prepared in advance. FIG. 9 illustrates an example of a computer. The computer 100 in FIG. 9 may execute a wavelength defragmentation program.

In FIG. 9, the computer 100 that executes a wavelength defragmentation program has a communication unit 110, a manipulation unit 120, a display unit 130, a hard disk drive (HDD) 140, a ROM 150, a RAM 160, a CPU 170, and a bus 180.

A wavelength defragmentation program that executes functions similar to the functions described above is pre-stored in the ROM 150. The wavelength defragmentation program may have been recorded in a drive-readable recording medium instead of the ROM 150. A portable recording medium such as a compact disk-read-only memory (CD-ROM), a digital versatile disk (DVD), a universal serial bus (USB) memory, or a secure digital (SD) card, or a semiconductor memory such as a flash memory, for example, may be used as a recording medium. The wavelength defragmentation program may include a selection program 150A, a movement program 150B, and control program 150C. The selection program 150A, movement program 150B, and control program 150C may be appropriately combined or separated. The computer 100 may acquire the wavelength defragmentation program from a portable physical medium and may execute the wavelength defragmentation program. The computer 100 may acquire the wavelength defragmentation program stored in, for example, another computer connected to the computer 100 through a public line, the Internet, a local area network (LAN), a wide area network (WAN), or the like and may execute the wavelength defragmentation program.

The CPU 170 reads out the selection program 150A, movement program 150B, and control program 150C from the ROM 150 and loads the read-out programs into the RAM 160. In the RAM 160, the CPU 170 causes the selection program 150A, movement program 150B, and control program 150C to function as a selection process 160A, a movement process 160B, and a control process 160C. In the CPU 170, all the above processing units may not operate; it suffices that a processing unit corresponding to processing to be executed operates.

According to design information used to allocate optical lines for each optical wavelength within a network, the CPU 170 executes defragmentation processing by which optical lines are reallocated to optical wavelengths. The CPU 170 selects optical lines according to a predetermined sequence included in the design information. The CPU 170 moves a selected optical line to its move-to optical wavelength. If it is difficult to move the selected optical line to its move-to optical wavelength, the CPU 170 stops the selection of the optical line, the selection being performed according to the predetermined sequence, and selects an optical line that is within the network and is indicated in a priority list. As a result, a time taken for wavelength defragmentation may be shortened while the wavelength defragmentation is kept at high precision.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus, comprising:
a memory that stores a wavelength defragmentation program; and
a processor that performs, based on the wavelength defragmentation program, operations of:
selecting an optical lane according to a specific sequence in design information to set one of optical wavelengths to respective optical lanes between a plurality of nodes within a network;
deciding whether a bit error rate of the selected optical lane is equal to or smaller than a threshold value when it is assumed that the one of wavelengths is set to the selected optical lane;
setting the one of wavelengths to the selected optical lane when the bit error rate of the selected optical lane is equal to or smaller than the threshold value;

stopping, when the bit error rate of the selected optical lane is not equal to or smaller than the threshold value, a set of the one of optical wavelengths to the selected optical lane and selecting a new optical lane from a priority list which stores one or more optical lanes having a dependency relation with the selected optical lane; and selecting, when there is no optical lane to which the one of optical wavelengths is to be set in the priority list, selects, as the new optical lane, an optical lane other than one or more independent optical lanes which have no dependency relation with the one or more optical lanes and the selected optical lane.

2. The information processing apparatus according to claim 1, wherein the processor, when the bit error rate of the selected optical lane is not equal to or smaller than the threshold value, stores, in the priority list, an optical lane having the dependency relationship with the selected optical lane and the selected optical lane based on the specific sequence.

3. The information processing apparatus according to claim 1, wherein the one or more independent optical lanes are stored in an independent optical lane list.

4. The information processing apparatus according to claim 1, wherein the processor stops, when the bit error rate of an optical lane having an optical wavelength adjacent to the one of optical wavelength is not equal to or smaller than the threshold value, the selection of the optical lane.

5. A wavelength defragmentation method, comprising:
    selecting, by a computer, an optical lane according to a specific sequence in design information to set one of optical wavelengths to respective optical lanes between a plurality of nodes within a network;
    deciding whether a bit error rate of the selected optical lane is equal to or smaller than a threshold value when it is assumed that the one of wavelengths is set to the selected optical lane;
    setting the one of wavelengths to the selected optical lane when the bit error rate of the selected optical lane is equal to or smaller than the threshold value;
    stopping, when the bit error rate of the selected optical lane is not equal to or smaller than the threshold value, a set of the one of optical wavelengths to the selected optical lane and selecting a new optical lane from a priority list which stores one or more optical lanes having a dependency relation with the selected optical lane; and
    selecting, when there is no optical lane to which the one of optical wavelengths is to be set in the priority list, selects, as the new optical lane, an optical lane other than one or more independent optical lanes which have no dependency relation with the one or more optical lanes and the selected optical lane.

6. The wavelength defragmentation method according to claim 5, further comprising:
    storing, when the bit error rate of the selected optical lane is not equal to or smaller than the threshold value, in the priority list, an optical lane having the dependency relationship with the selected optical lane and the selected optical lane based on the specific sequence.

7. The wavelength defragmentation method according to claim 5, wherein the one or more independent optical lanes are stored in an independent optical lane list.

8. The wavelength defragmentation method according to claim 5, further comprising:
    stopping, when the bit error rate of an optical lane having an optical wavelength adjacent to the one of optical wavelength is not equal to or smaller than the threshold value, the selection of the optical lane.

9. A non-transitory recording medium recording wavelength defragmentation program causing a computer to preform operations, the operations comprising:
    selecting an optical lane according to a specific sequence in design information to set one of optical wavelengths to respective optical lanes between a plurality of nodes within a network;
    deciding whether a bit error rate of the selected optical lane is equal to or smaller than a threshold value when it is assumed that the one of wavelengths is set to the selected optical lane;
    setting the one of wavelengths to the selected optical lane when the bit error rate of the selected optical lane is equal to or smaller than the threshold value;
    stopping, when the bit error rate of the selected optical lane is not equal to or smaller than the threshold value, a set of the one of optical wavelengths to the selected optical lane and selecting a new optical lane from a priority list which stores one or more optical lanes having a dependency relation with the selected optical lane; and
    selecting, when there is no optical lane to which the one of optical wavelengths is to be set in the priority list, an optical lane other than one or more independent optical lanes which have no dependency relation with the one or more optical lanes and the selected optical lane.

10. The non-transitory recording medium according to claim 9, further comprising:
    storing, when the bit error rate of the selected optical lane is not equal to or smaller than the threshold value, in the priority list, an optical lane having the dependency relationship with the selected optical lane and the selected optical lane based on the specific sequence.

11. The non-transitory recording medium according to claim 9, wherein the one or more independent optical lanes are stored in an independent optical lane list.

12. The non-transitory recording medium according to claim 9, further comprising:
    stopping, when the bit error rate of an optical lane having an optical wavelength adjacent to the one of optical wavelength is not equal to or smaller than the threshold value, the selection of the optical lane.

* * * * *